(12) United States Patent
Calvignac et al.

(10) Patent No.: US 8,762,399 B2
(45) Date of Patent: Jun. 24, 2014

(54) HASH COLLISION REDUCTION SYSTEM

(75) Inventors: Jean L. Calvignac, Raleigh, NC (US);
Casimer M. DeCusatis, Poughkeepsie, NY (US); Fabrice J. Verplanken, LaGaude (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 13/475,990

(22) Filed: May 20, 2012

(65) Prior Publication Data

US 2013/0311492 A1    Nov. 21, 2013

(51) Int. Cl.
*G06F 17/30* (2006.01)
(52) U.S. Cl.
CPC ................ *G06F 17/30002* (2013.01)
USPC .......................... 707/756; 707/802
(58) Field of Classification Search
USPC ............... 707/747, 756, 698, 792, 802, 803; 711/216
See application file for complete search history.

(56) References Cited

U.S. PATENT DOCUMENTS

| | | | |
|---|---|---|---|
| 2005/0111446 A1* | 5/2005 | Greaves et al. | 370/389 |
| 2007/0294506 A1* | 12/2007 | Ross | 711/216 |
| 2008/0229056 A1 | 9/2008 | Agarwal et al. | 711/216 |
| 2008/0235488 A1* | 9/2008 | Ross | 711/216 |
| 2009/0262925 A1 | 10/2009 | Vijayarangan | |
| 2010/0036820 A1 | 2/2010 | Stergiou et al. | 711/206 |
| 2013/0311436 A1* | 11/2013 | Calvignac et al. | 707/698 |

OTHER PUBLICATIONS

Anderson, Parallel hashed key access on the Connection Machine, 1988, IEEE, 643-645.*
Layali Rashid et al., "An Efficient Hardware-based Multi-hash Scheme for High Speed IP Lockup", Proceedings of the Annual IEEE Symposium on High-Performance Interconnects (HOTI), Stanford, CA, Aug. 2008.

* cited by examiner

*Primary Examiner* — Jean B Fleurantin
(74) *Attorney, Agent, or Firm* — Steven Chiu (57) ABSTRACT

An improved computer system that can include a controller having a computer processor, the controller to reduce insertion times and/or collisions when interfacing with new components introduced to the controller. The system may also include a collision avoidance apparatus that reduces hashing collisions by using a plurality of tables and a plurality of keys per bucket. The system may further include a hash apparatus in communication with the controller to map the plurality of keys to the plurality of tables where the hash apparatus uses a single hash logic to provide an avalanche effect when one key is changed which results in nearly half of bits changing in the plurality of tables.

18 Claims, 13 Drawing Sheets

HASH COLLISION REDUCTION SYSTEM

BACKGROUND

The invention relates to the field of computer systems, and, more particularly, to a computer implemented packet look-up mechanism for very large tables and very high throughput.

An Ethernet port may provide a connection between a computer and a computer network. For a 100 Gbps Ethernet port, the smallest 64 bytes packet duration time is 6.7 nanoseconds, which gives only 3 clock cycles at 500 Mhz for the logic doing the look up.

SUMMARY

According to one embodiment of the invention, an improved computer system may include a controller having a computer processor, the controller to reduce insertion times and/or hashing collisions when interfacing with new components introduced to the controller. The system may also include a collision avoidance apparatus that reduces the hashing collisions by using a plurality of tables and a plurality of keys per bucket. The system may further include a hash apparatus in communication with the controller to map the plurality of keys to the plurality of tables where the hash apparatus uses a single hash logic to provide an avalanche effect when one key is changed which results in nearly half of bits changing in the plurality of tables.

The single hash logic may be based upon the Cuckoo algorithm. The single hash logic may comprise a configurable cyclic redundancy check polynomial. The hash apparatus may provide parallel table lookup of the plurality of tables based upon the avalanche effect.

The avalanche effect may be based upon orthogonal hash functions for each of the plurality of tables, and the single hash logic implements each orthogonal hash function. Each bit output of the single hash logic may comprise funneled results of the key bits.

The funneled results may be generated by an XOR function. The plurality of tables may be configurable. The global load of the plurality of tables may be configurable by controlling the number of bits for the single hash logic output.

Another aspect of the invention is a method for improving a computer system. The method may include reducing insertion times and/or hashing collisions when new components are introduced to a controller that includes a computer processor. The method may also include reducing the hashing collisions by using a plurality of tables and a plurality of keys per bucket through a collision avoidance apparatus. The method may further include mapping the plurality of keys to the plurality of tables with a hash apparatus in communication with the controller where the hash apparatus uses a single hash logic to provide an avalanche effect when one key is changed which results in nearly half of bits changing in the plurality of tables.

The method may additionally include providing parallel table lookup of the plurality of tables via the hash apparatus based upon the avalanche effect. The method may also include basing the avalanche effect upon orthogonal hash functions for each of the plurality of tables, and the single hash logic implements each orthogonal hash function.

The method may further include funneling results of the key bits for each bit output of the single hash logic. The method may additionally include making the plurality of tables configurable. The method may also include controlling the number of bits for the single hash logic output so global load of the plurality of tables is configurable.

Another aspect of the invention is computer readable program codes coupled to tangible media to improve a computer system. The computer readable program codes may be configured to cause the program to reduce insertion times and/or hashing collisions when new components are introduced to a controller that includes a computer processor. The computer readable program codes may also reduce the hashing collisions by using a plurality of tables and a plurality of keys per bucket through a collision avoidance apparatus. The computer readable program codes may further map the plurality of keys to the plurality of tables with a hash apparatus in communication with the controller where the hash apparatus uses a single hash logic to provide an avalanche effect when one key is changed which results in nearly half of bits changing in the plurality of tables.

The computer readable program codes may additionally provide parallel table lookup of the plurality of tables via the hash apparatus based upon the avalanche effect. The computer readable program codes may also base the avalanche effect upon orthogonal hash functions for each of the plurality of tables, and the single hash logic implements each orthogonal hash function.

The computer readable program codes may further funnel results of the key bits for each bit output of the single hash logic. The computer readable program codes may additionally make the plurality of tables configurable. The computer readable program codes may also control the number of bits for the single hash logic output so global load of the plurality of tables is configurable.

DETAILED DESCRIPTION

The invention will now be described more fully hereinafter with reference to the accompanying drawings, in which preferred embodiments of the invention are shown. Like numbers refer to like elements throughout.

Figure 1:
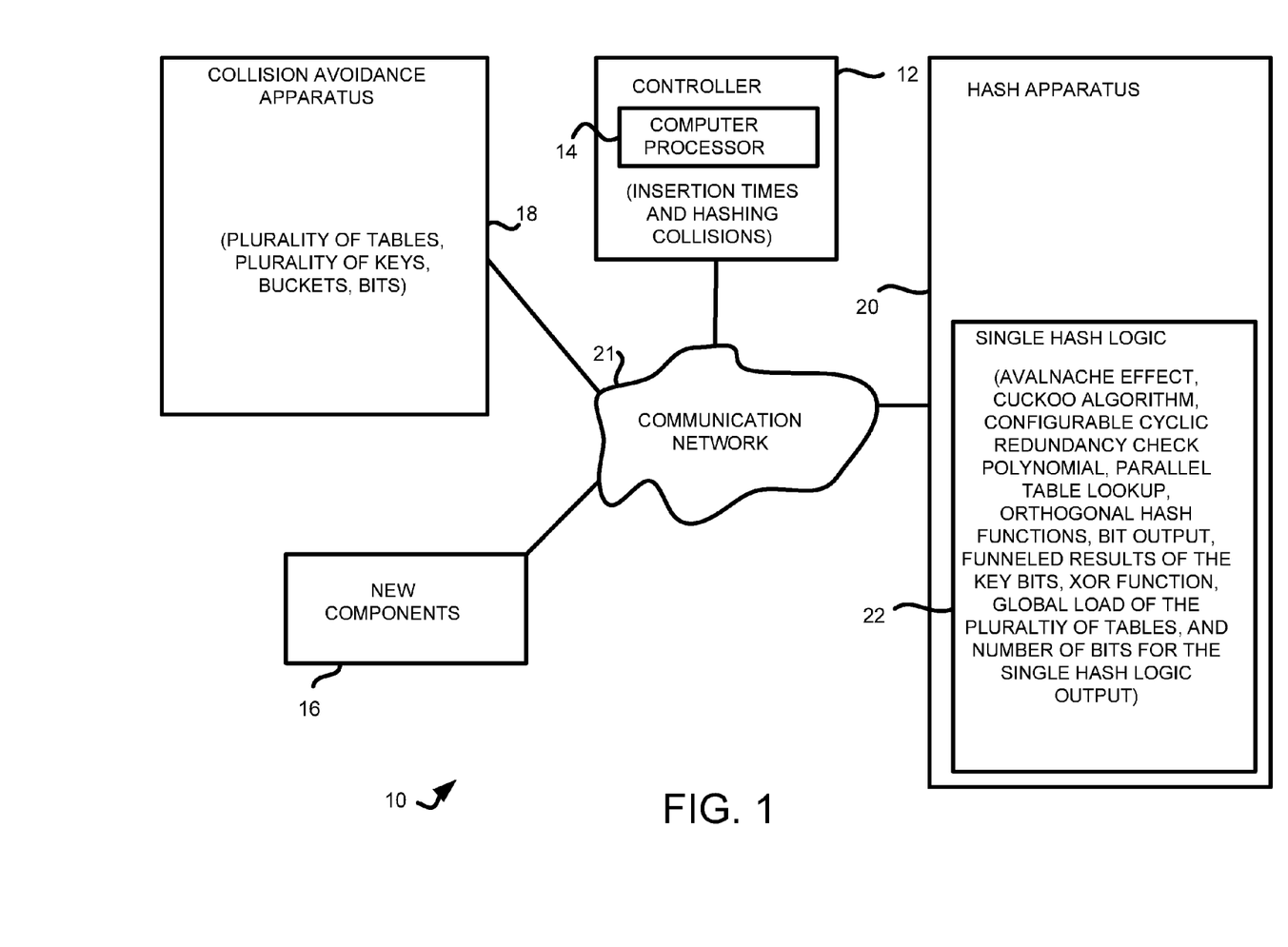
FIG. 1 is a block diagram illustrating a database improvement system in accordance with the invention.

With reference now to FIG. 1, an improved computer system 10 is initially described. In an embodiment, the system 10 includes a controller 12 comprising a computer processor 14. The controller 12 reduces insertion times and/or hashing collisions when interfacing with new components 16 introduced to the controller. The system 10 also includes a collision avoidance apparatus 18 that reduces hashing collisions by using a plurality of tables and a plurality of keys per bucket. The system 10 further includes a hash apparatus 20 in communication with the controller 12 to map the plurality of keys to the plurality of tables where the hash apparatus uses a single hash logic 22 to provide an avalanche effect when one key is changed which results in nearly half of bits changing in the plurality of tables. The components of system 10 are connected by a communications network 21 as will be appreciated by those of skill in the art.

In one embodiment, the single hash logic 22 is based upon the Cuckoo algorithm. In another embodiment, the single hash logic 22 comprises a configurable cyclic redundancy check (CRC) polynomial. In another embodiment, the hash apparatus 20 provides parallel table lookup of the plurality of tables based upon the avalanche effect.

In one embodiment, the avalanche effect is based upon orthogonal hash functions for each of the plurality of tables, and the single hash logic 22 implements each orthogonal hash function. In another embodiment, each bit output of the single hash logic 22 comprises funneled results of the key bits.

In one embodiment, the funneled results are generated by an XOR function. In another embodiment, the plurality of tables are configurable. In another embodiment, the global load of the plurality of tables are configurable by controlling the number of bits for the single hash logic 22 output.

Figure 2:
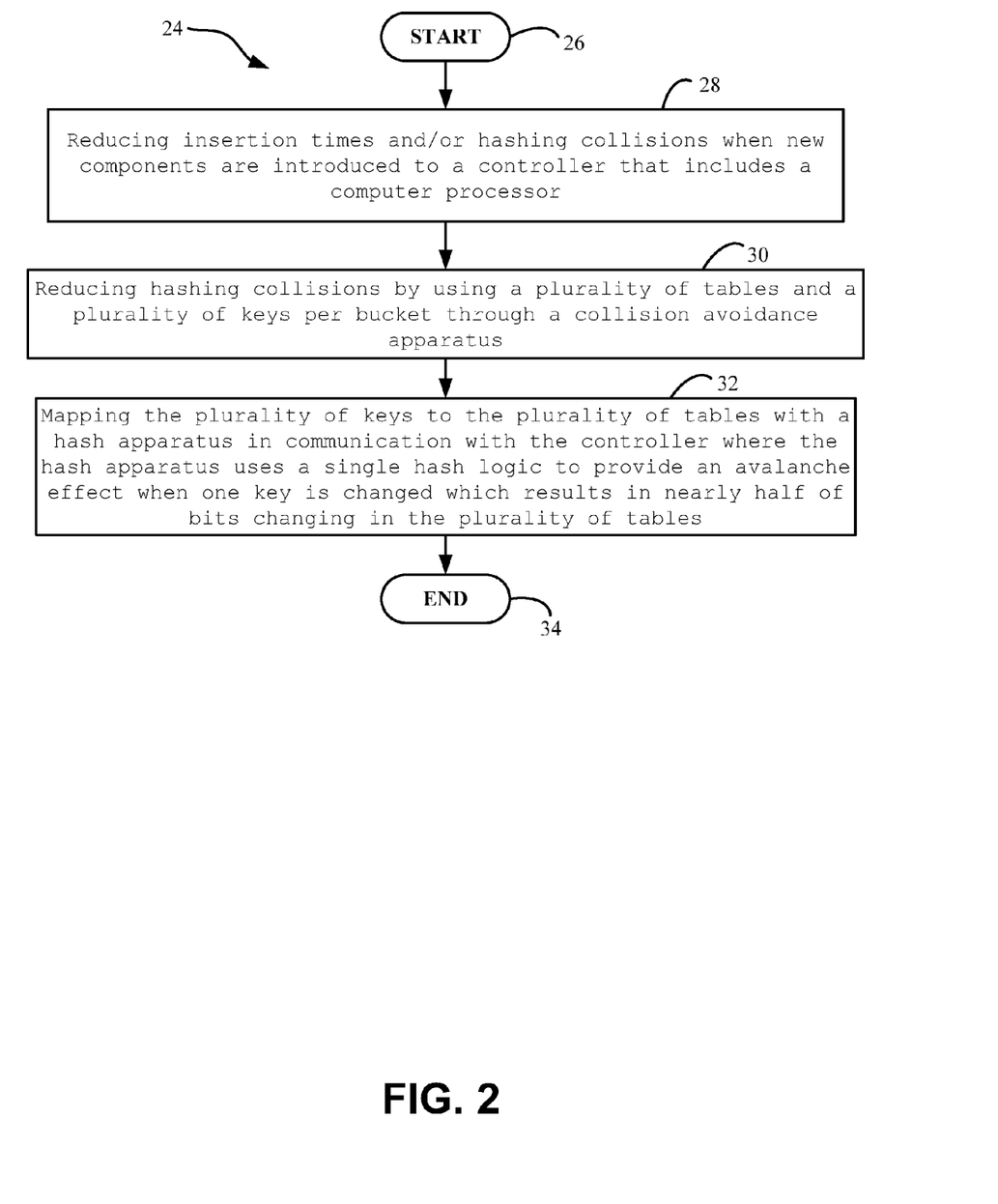
FIG. 2 is a flowchart illustrating method aspects according to the invention.

Another aspect of the invention is a method for improving a computer system, which is now described with reference to flowchart 24 of FIG. 2. The method begins at Block 26 and may include reducing insertion times and/or hashing collisions when new components are introduced to a controller that includes a computer processor at Block 28. The method may also include reducing hashing collisions by using a plurality of tables and a plurality of keys per bucket through a collision avoidance apparatus at Block 30. The method may further include mapping the plurality of keys to the plurality of tables with a hash apparatus in communication with the controller where the hash apparatus uses a single hash logic to provide an avalanche effect when one key is changed which results in nearly half of bits changing in the plurality of tables at Block 32. The method ends at Block 34.

Figure 3:
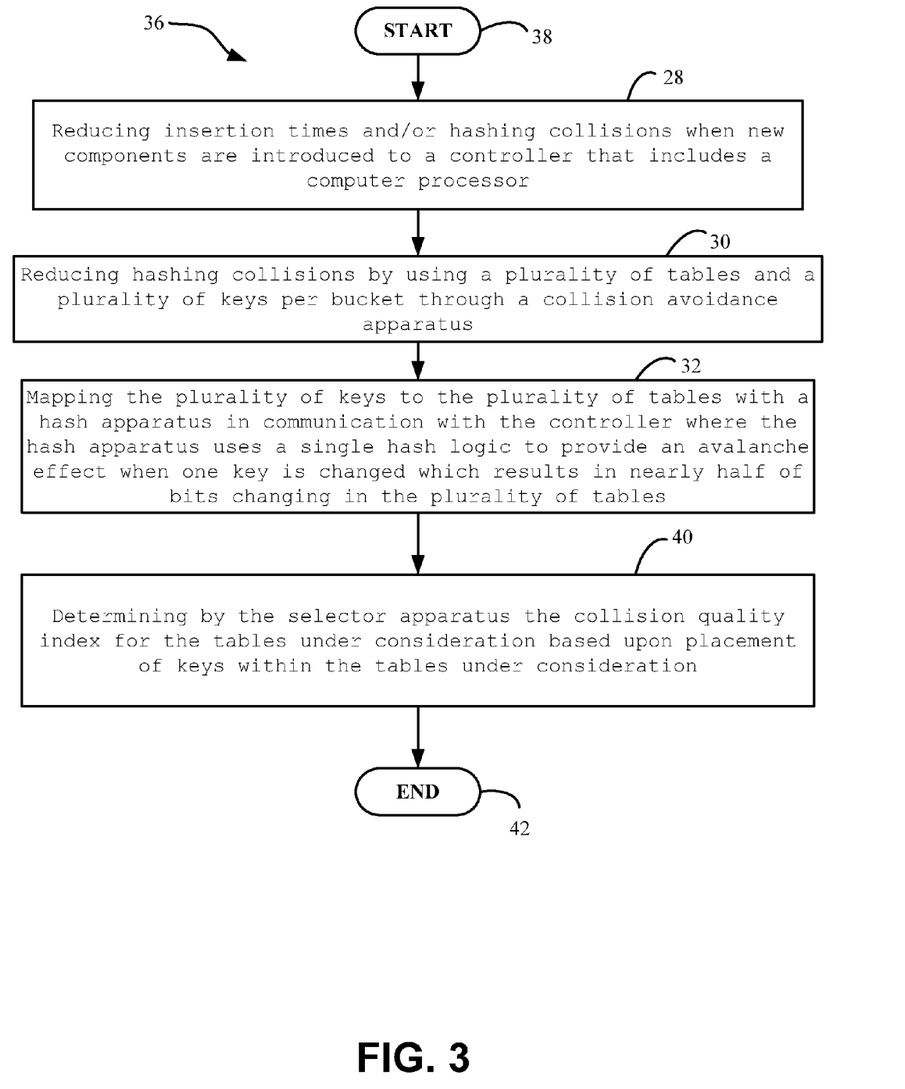
FIG. 3 is a flowchart illustrating method aspects according to the method of FIG. 2.

In another method embodiment, which is now described with reference to flowchart 36 of FIG. 3, the method begins at Block 38. The method may include the steps of FIG. 2 at Blocks 28, 30, and 32. The method may additionally include providing parallel table lookup of the plurality of tables via the hash apparatus based upon the avalanche effect at Block 40. The method ends at Block 42.

Figure 4:
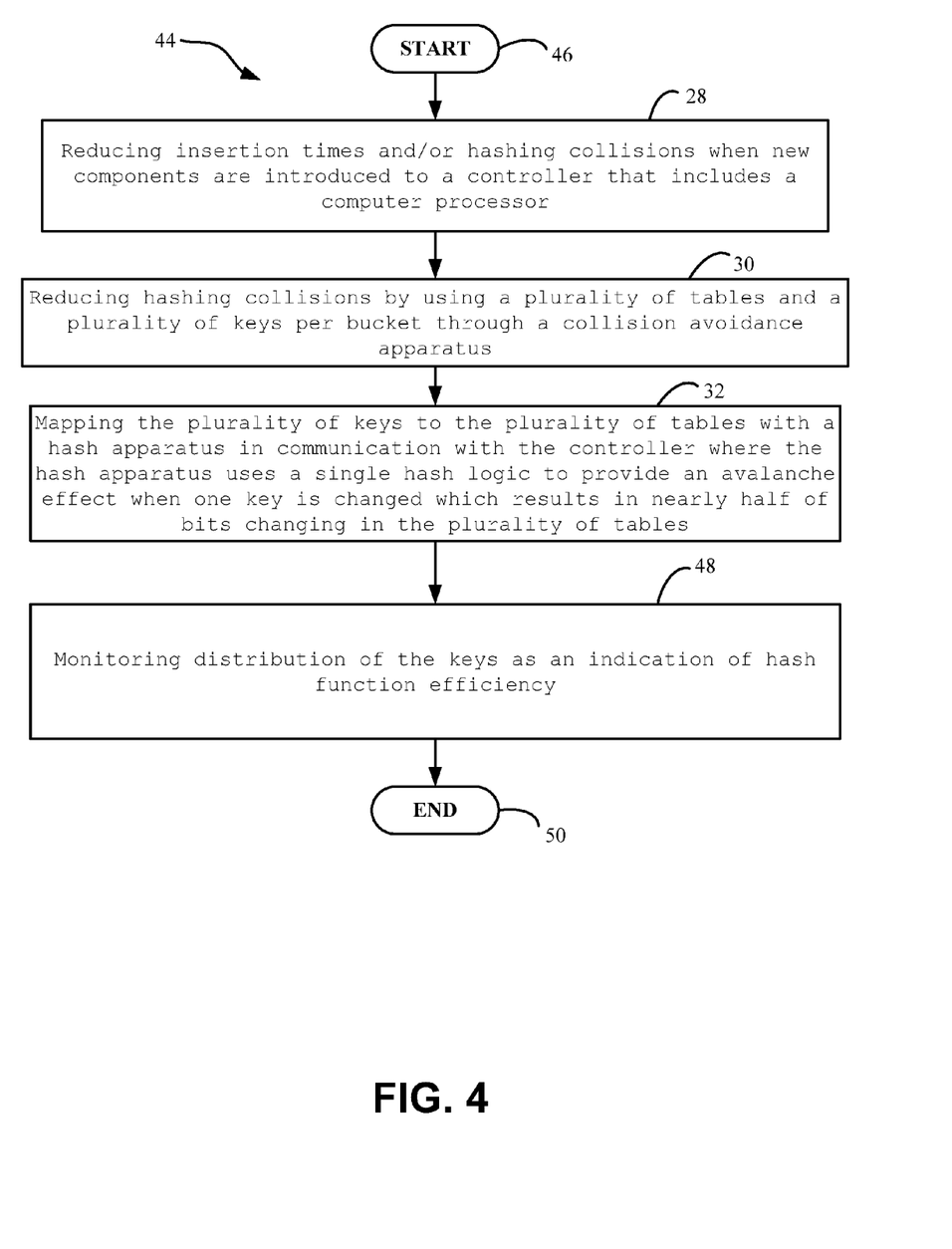
FIG. 4 is a flowchart illustrating method aspects according to the method of FIG. 2.

In another method embodiment, which is now described with reference to flowchart 44 of FIG. 4, the method begins at Block 46. The method may include the steps of FIG. 2 at Blocks 28, 30, and 32. The method may also include basing the avalanche effect upon orthogonal hash functions for each of the plurality of tables, and the single hash logic implements each orthogonal hash function at Block 48. The method ends at Block 50.

Figure 5:
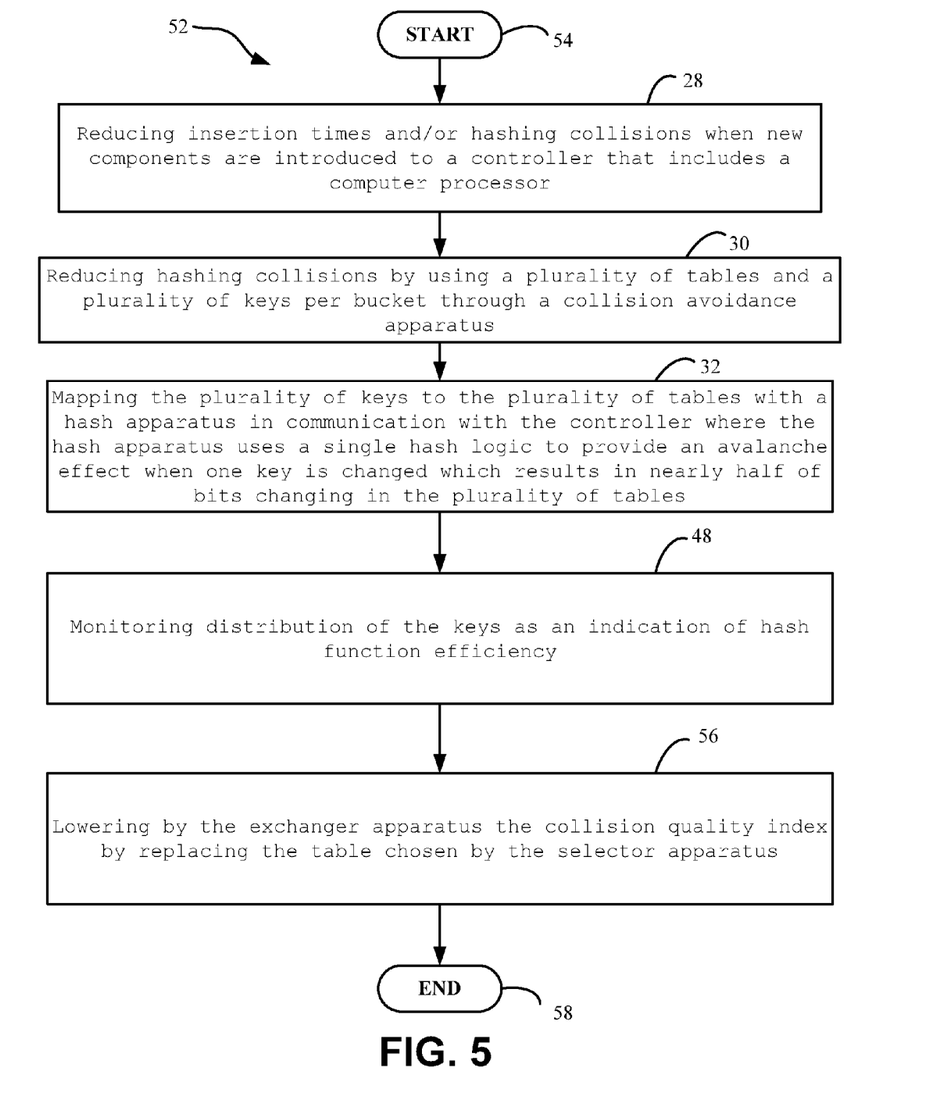
FIG. 5 is a flowchart illustrating method aspects according to the method of FIG. 4.

In another method embodiment, which is now described with reference to flowchart 52 of FIG. 5, the method begins at Block 54. The method may include the steps of FIG. 4 at Blocks 28, 30, 32, and 48. The method may further include funneling results of the key bits for each bit output of the single hash logic at Block 56. The method ends at Block 58.

Figure 6:
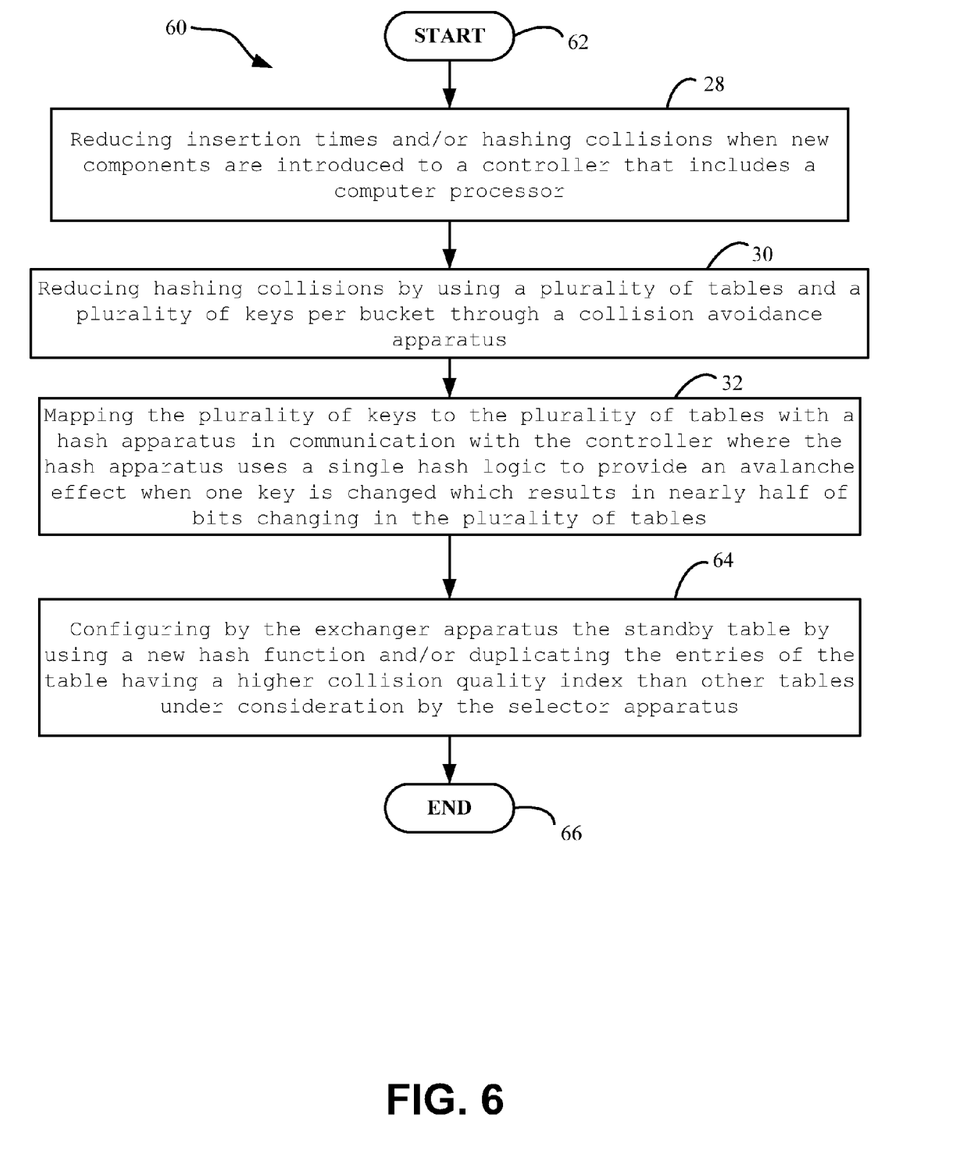
FIG. 6 is a flowchart illustrating method aspects according to the method of FIG. 2.

In another method embodiment, which is now described with reference to flowchart 60 of FIG. 6, the method begins at Block 62. The method may include the steps of FIG. 2 at Blocks 28, 30, and 32. The method may additionally include making the plurality of tables configurable at Block 64. The method ends at Block 66.

Figure 7:
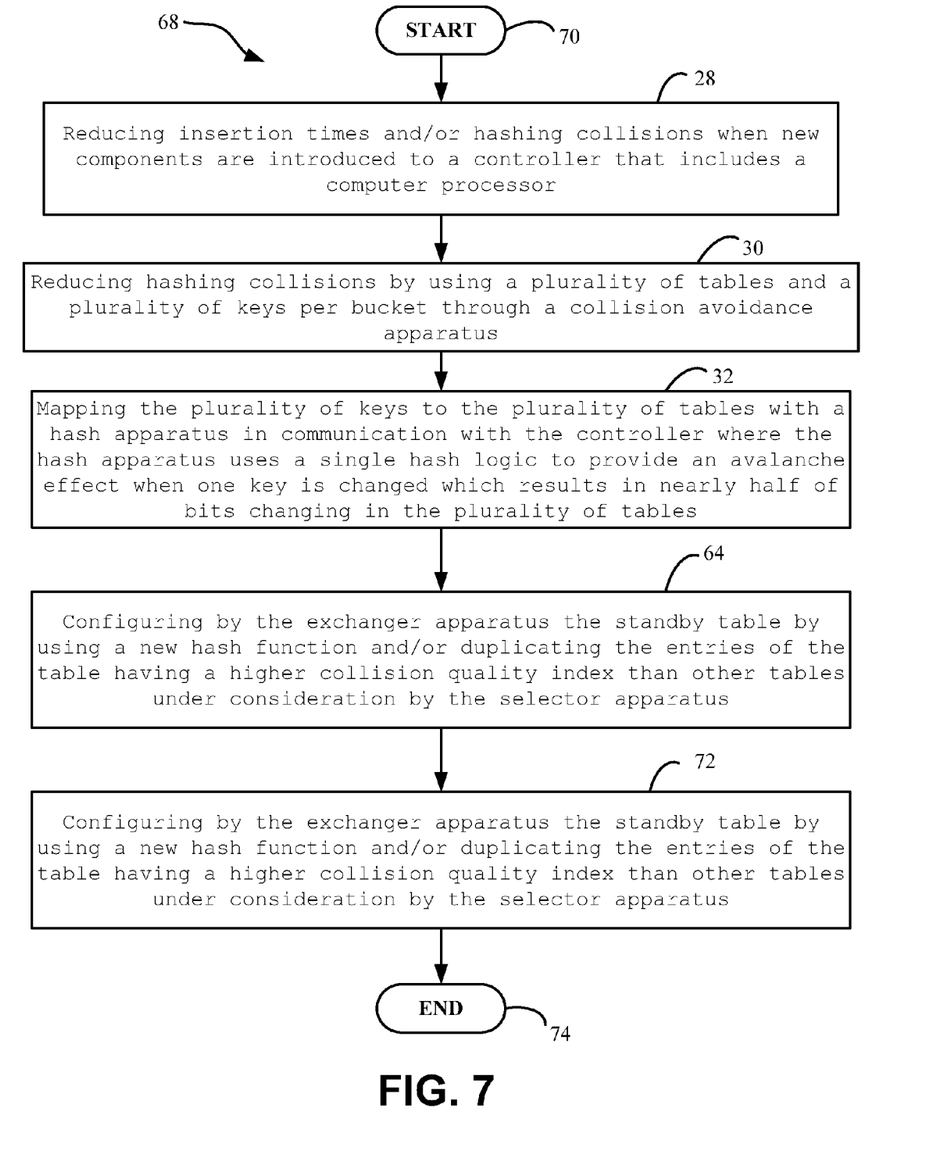
FIG. 7 is a flowchart illustrating method aspects according to the method of FIG. 6.

In another method embodiment, which is now described with reference to flowchart 68 of FIG. 7, the method begins at Block 70. The method may include the steps of FIG. 6 at Blocks 28, 30, 32, and 64. The method may also include controlling the number of bits for the single hash logic output so global load of the plurality of tables is configurable at Block 72. The method ends at Block 74.

Another aspect of the invention is computer readable program codes coupled to tangible media to improve a computer system. The computer readable program codes may be configured to cause the program to reduce insertion times and/or hashing collisions when new components 16 are introduced to a controller 12 that includes a computer processor 14. The computer readable program codes may also reduce hashing collisions by using a plurality of tables and a plurality of keys per bucket through a collision avoidance apparatus 18. The computer readable program codes may further map the plurality of keys to the plurality of tables with a hash apparatus 20 in communication with the controller 12 where the hash apparatus uses a single hash logic 22 to provide an avalanche effect when one key is changed which results in nearly half of bits changing in the plurality of tables.

The computer readable program codes may additionally provide parallel table lookup of the plurality of tables via the hash apparatus 22 based upon the avalanche effect. The computer readable program codes may also base the avalanche effect upon orthogonal hash functions for each of the plurality of tables, and the single hash logic 22 implements each orthogonal hash function.

The computer readable program codes may further funnel results of the key bits for each bit output of the single hash logic 22. The computer readable program codes may additionally make the plurality of tables configurable. The computer readable program codes may also control the number of bits for the single hash logic 22 output so global load of the plurality of tables is configurable.

In view of the foregoing, the system 10 provides an improved computer system. For example, using conventional hashing with chaining such as the "Cuckoo Algorithm" can do a search in a few bonded number of table lookups when used in a 100 Gbps Ethernet application, but its drawback is a long insertion time when a lot of hashing collisions are present in a very large table. In contrast, system 10 enables insertion in the same time range as a search, which is important when new table insertion is done on the fly by packet learning in a plug and play network.

System 10 uses efficient hashing and/or algorithm selection for collision avoidance and reduced insertion time. System 10 provides packet look-up for very large tables and high throughput.

In one embodiment, system 10 provides hardware implementation of a single hashing method capable of using any type of CRC polynomial division, for any number of logic tables, thereby reducing cache collisions. System 10 hardware implementation of a packet lookup function supports a very large number of large keys (hundreds of millions) and very high throughput (100 Gbps Ethernet). In another embodiment, system 10 is based on a single logic 22 in which system 10 can configure any type of CRC polynomials. In another embodiment, system 10 reduces collisions using orthogonality and high avalanche effect for a plurality of hashers thereby enabling the lookup of several tables in parallel.

In one embodiment, efficient orthogonal hashers are used for each different table. In another embodiment, to be efficient, a hasher should provide a high avalanche effect, e.g. around half of the bits of the hash result change when only one bit of the key is changed.

This can be achieved by division or multiplication of the key, but with the very limited clock cycles for 100 Gbps aggregate throughput, such hardware implementation of multiplication is difficult. XOR folding can be implemented in hardware but they do not provide a good avalanche result. CRC can work because it provides a good avalanche effect and can be implemented in hardware with XOR funneling, but it does require a lot of logic XOR circuits, which leads to large logic circuitry for different tables.

To reduce the collisions, system 10 uses 4 different tables and 8 keys per bucket, in one embodiment. In another embodiment, a single programmable hasher 22 is used where each bit of the hasher result is the funnel result of all the bits of the key, which allows the implementation of any type of CRC polynomial. This requires a large number of XOR circuits, but the sharing of the single logic 22 for the 4 different tables makes it affordable.

In one embodiment, the flexible hardware implementation to optimize the solution with the lookup table includes having the number of hash tables configurable from 2 to 5 (basic configuration could be 4 actives+1 standby). In another embodiment, the 5 hashing functions are XOR matrix fully configurable. Even if the matrix allows different types of hash configuration, CRC hashing function is the preferred choice.

In one embodiment, the global table load will be configurable by providing configuration of the number of bits for the hash result (hardware can support up to 19 b hash value 4M entries per table). In another embodiment, "On the Fly" keys comparison help to optimize back to back DMA requests and responses.

Figure 8:
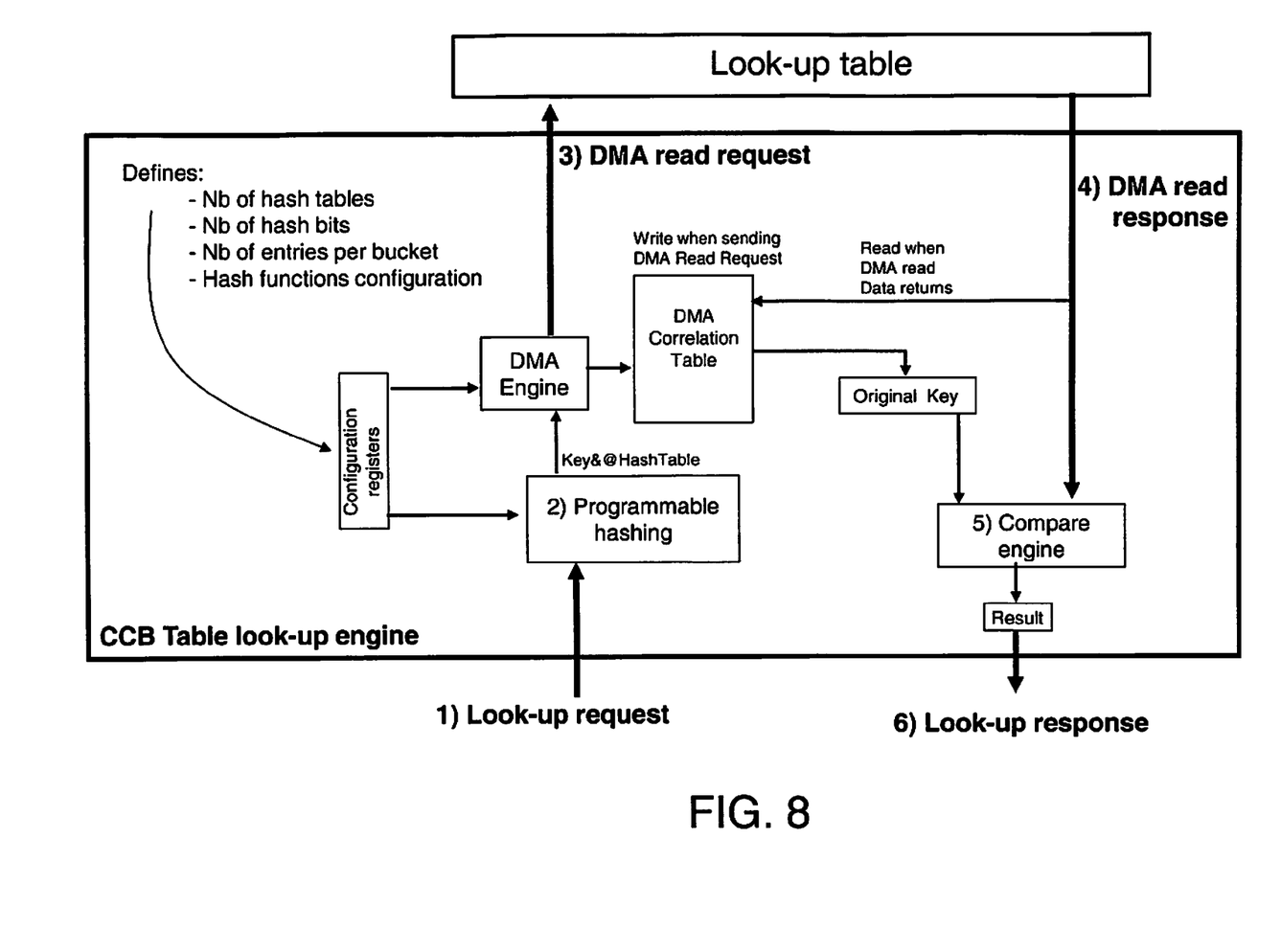
FIG. 8 illustrates a CCB table lookup engine's high level structure in accordance with the invention.

With additional reference to FIG. 8, a CCB table lookup engine's high level structure is illustrated. In one embodiment, the lookup process includes: look-up request received; goes thru hash functions to compute memory address; DMA read request; DMA read response; read data is compared to original key; and look-up response is sent to requester.

Figure 9:
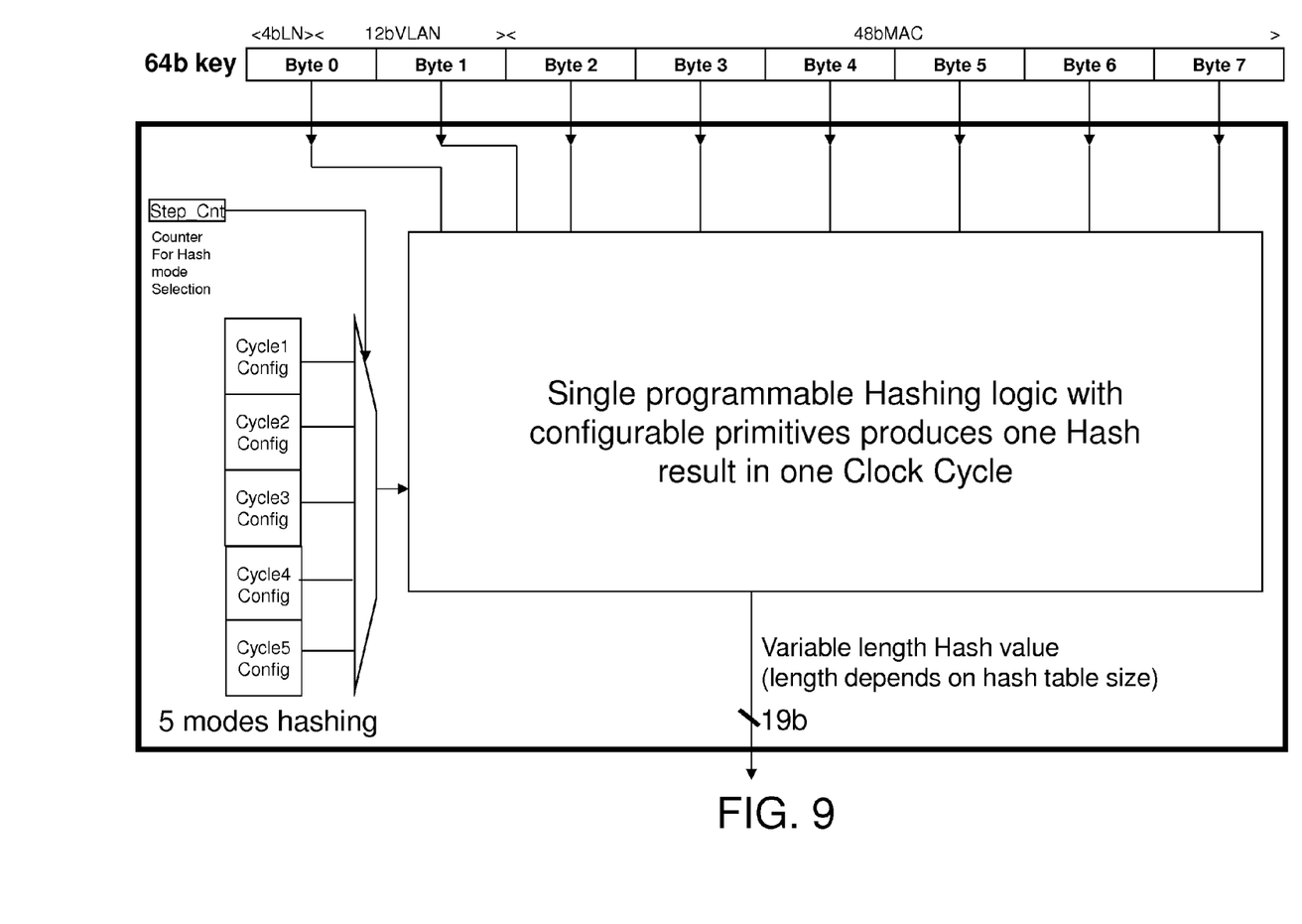
FIG. 9 illustrates a 5 modes programmable hashing logic's high level structure in accordance with the invention.
Figure 10:
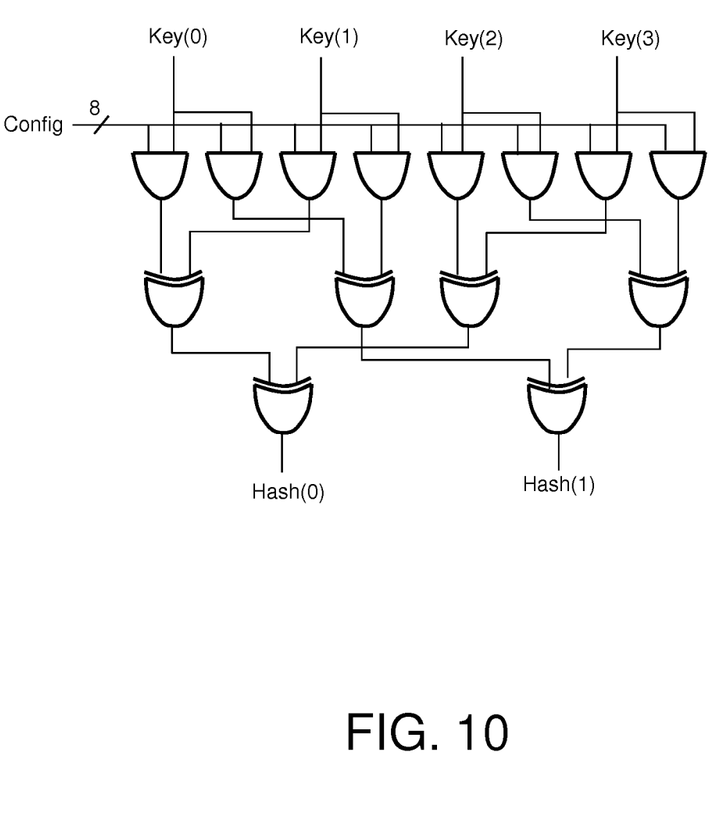
FIG. 10 illustrates a 4 to 2 example in accordance with the invention.

With additional reference to FIGS. 9-10, a 5 modes programmable hashing logic's high level structure is illustrated in FIG. 9. FIG. 10 discloses a 4 to 2 exemplary embodiment of the invention.

In one embodiment, probably the most flexible implementation of system 10, all the key bits can participate to any hash bit. This implementation makes the hardware almost independent of refinement to the algorithms and the maximum number of tables because the "intelligence"

is in the hash logic 22.

In one embodiment, sizing for a 64 b key, 19 b hash, and 5 hash functions provides:

64*19*5=6080 configuration latches
(64*19) 5to1 muxes to select configuration
(64*19) 2to1 AND gates
19*(32+16+8+4+2+1)=1197 2to1 XOR gates
A rough area estimate for 45 nm implementation include:
Latch: 6080*10 µm2=60800 µm2
XOR2: 1197*4 µm2=4788 µm2
AND2: 64*19*3 µm2=3648 µm2
AO22: 3*64*19*4 µm2=14592 µm2
Total=(60800+4788+3648+14592)*1.4 (assume 60% wireability)=117359 µm2, about 0.12 mm2

Figure 11:
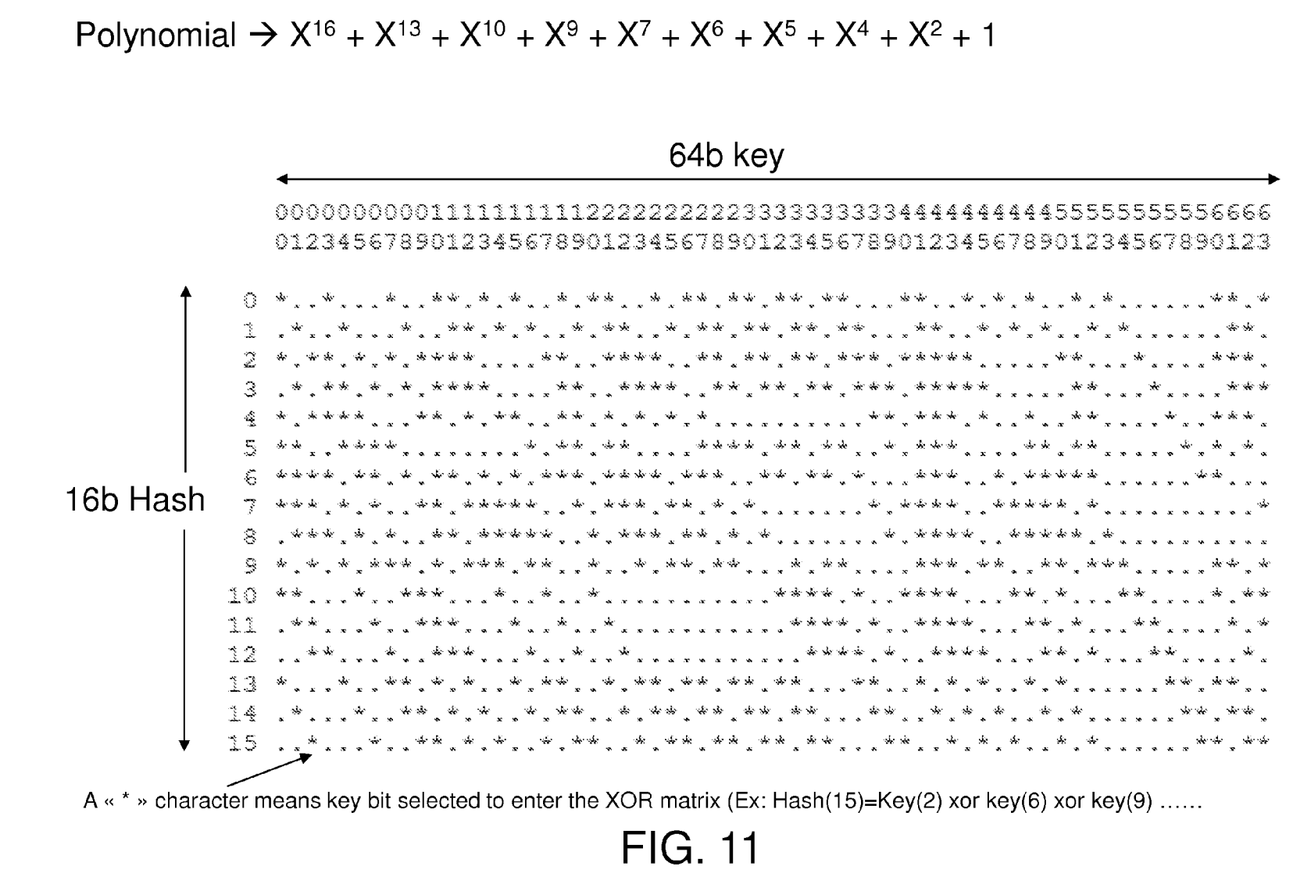
FIG. 11 illustrates an XOR Matrix example in accordance with the invention.

FIG. 11 illustrates an XOR Matrix example in accordance with the invention. In this example, a 64 b key is hashed to a 16 b hash value.

Figure 12:
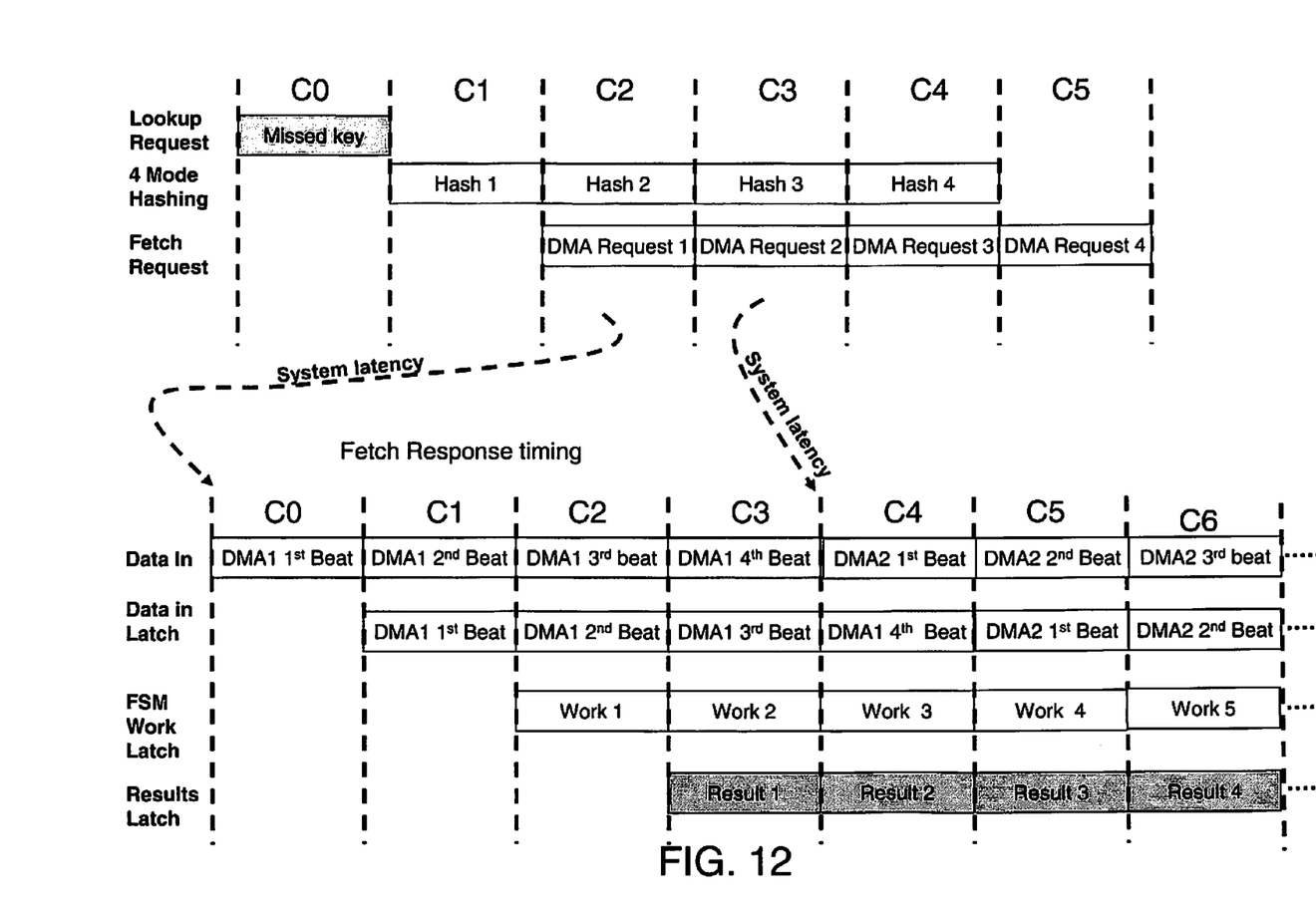
FIG. 12 illustrates remote lookup request timing in accordance with the invention.
Figure 13:
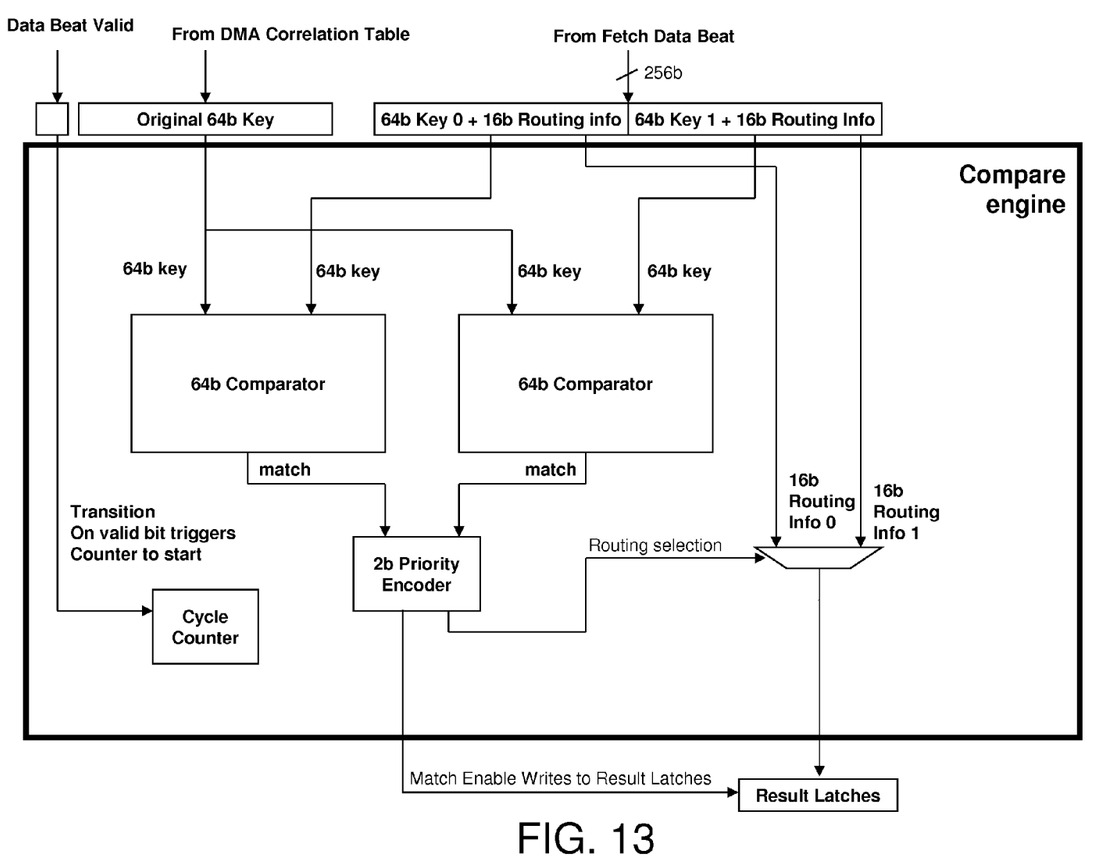
FIG. 13 illustrates an "On the fly" compare engine in accordance with the invention.

FIG. 12 illustrates remote lookup request timing. In this example, a 4 hash table case is shown. FIG. 13 illustrates an "On the fly" compare engine.

In one embodiment, system 10 provides a method for a table lookup. The method may include hardware means for executing a single hash function for mapping one of hundreds of millions of keys to a slot, e.g. bucket, in the table whereby the hashing function produces a high avalanche effect when only one bit of a key is changed. The method may also include means for minimizing hashing collisions by implementing four different tables and eight keys per bucket.

In one embodiment, system 10 provides hardware implementation of a packet lookup function supporting a very large number of large keys, e.g. hundreds of millions, and very high throughput, e.g. 100 Gbps Ethernet, based on a single logic 22 that can be configured to any type of CRC polynomials while reducing collisions with orthogonality and high avalanche effect for a plurality of hashers to enable the lookup of several tables in parallel.

In one embodiment, system 10 provides a method and system for executing a single hashing logic 22 to map a very large set of keys to a slot, e.g. bucket, with a high avalanche effect. In another embodiment, system 10 reduces hashing collision by sharing the single hashing logic 22 for four different tables and eight keys per slot.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a controller including a computer processor, the controller to reduce at least one of insertion times and hashing collisions when interfacing with new components introduced to the controller;
a collision avoidance apparatus that reduces the hashing collisions by using a plurality of tables and a plurality of keys per bucket;
a hash apparatus in communication with the controller to map the plurality of keys to the plurality of tables where the hash apparatus uses a single hash logic to provide an avalanche effect when one key is changed which results in nearly half of bits changing in the plurality of tables;
a monitor that monitors distribution of the keys as an indication of hash function efficiency; and
wherein the hash apparatus provides parallel table lookup of the plurality of tables based upon the avalanche effect.

2. The system of claim 1 wherein the single hash logic is based upon the Cuckoo algorithm.

3. The system of claim 1 wherein the single hash logic comprises a configurable cyclic redundancy check polynomial.

4. The system of claim 1 wherein the avalanche effect is based upon orthogonal hash functions for each of the plurality of tables, and the single hash logic implements each orthogonal hash function.

5. The system of claim 4 wherein each bit output of the single hash logic comprises funneled results of the key bits.

6. The system of claim 5 wherein the funneled results are generated by an XOR function.

7. The system of claim 1 wherein the plurality of tables is configurable.

8. The system of claim 7 wherein global load of the plurality of tables is configurable by controlling the number of bits for the single hash logic output.

9. A method comprising:
reducing at least one of insertion times and hashing collisions when new components are introduced to a controller that includes a computer processor;
reducing the hashing collisions by using a plurality of tables and a plurality of keys per bucket through a collision avoidance apparatus;
mapping by the computer processor the plurality of keys to the plurality of tables with a hash apparatus in communication with the controller, the hash apparatus uses a single hash logic to provide an avalanche effect when one key is changed which results in nearly half of bits changing in the plurality of tables;
monitoring distribution of the keys as an indication of hash function efficiency; and
providing parallel table lookup of the plurality of tables via the hash apparatus based upon the avalanche effect.

10. The method of claim 9 further comprising basing the avalanche effect upon orthogonal hash functions for each of the plurality of tables, and the single hash logic implements each orthogonal hash function.

11. The method of claim 10 further comprising funneling results of the key bits for each bit output of the single hash logic.

12. The method of claim 9 further comprising making the plurality of tables configurable.

13. The method of claim 12 further comprising controlling the number of bits for the single hash logic output so global load of the plurality of tables is configurable.

14. A computer program product embodied in a non-transitory computer usable medium comprising:
computer readable program codes coupled to the non-transitory computer usable medium to improve computer systems, the computer readable program codes configured to cause the program to:
reduce at least one of insertion times and hashing collisions when new components are introduced to a controller that includes a computer processor;
reduce the hashing collisions by using a plurality of tables and a plurality of keys per bucket through a collision avoidance apparatus;
map the plurality of keys to the plurality of tables with a hash apparatus in communication with the controller, the hash apparatus uses a single hash logic to provide an avalanche effect when one key is changed which results in nearly half of bits changing in the plurality of tables;
monitor distribution of the keys as an indication of hash function efficiency; and
provide parallel table lookup of the plurality of tables via the hash apparatus based upon the avalanche effect.

15. The computer program product of claim 14 further comprising program code configured to: base the avalanche effect upon orthogonal hash functions for each of the plurality of tables, and the single hash logic implements each orthogonal hash function.

16. The computer program product of claim 15 further comprising program code configured to: funnel results of the key bits for each bit output of the single hash logic.

17. The computer program product of claim 14 further comprising program code configured to: make the plurality of tables configurable.

18. The computer program product of claim 17 further comprising program code configured to: control the number of bits for the single hash logic output so global load of the plurality of tables is configurable.

* * * * *